Jan. 23, 1962

T. A. REILLY 3,017,844

BUN OR THE LIKE TREATING APPARATUS

Filed Aug. 10, 1959

INVENTOR:
THOMAS A. REILLY

BY Roy E. Raney

ATTORNEY

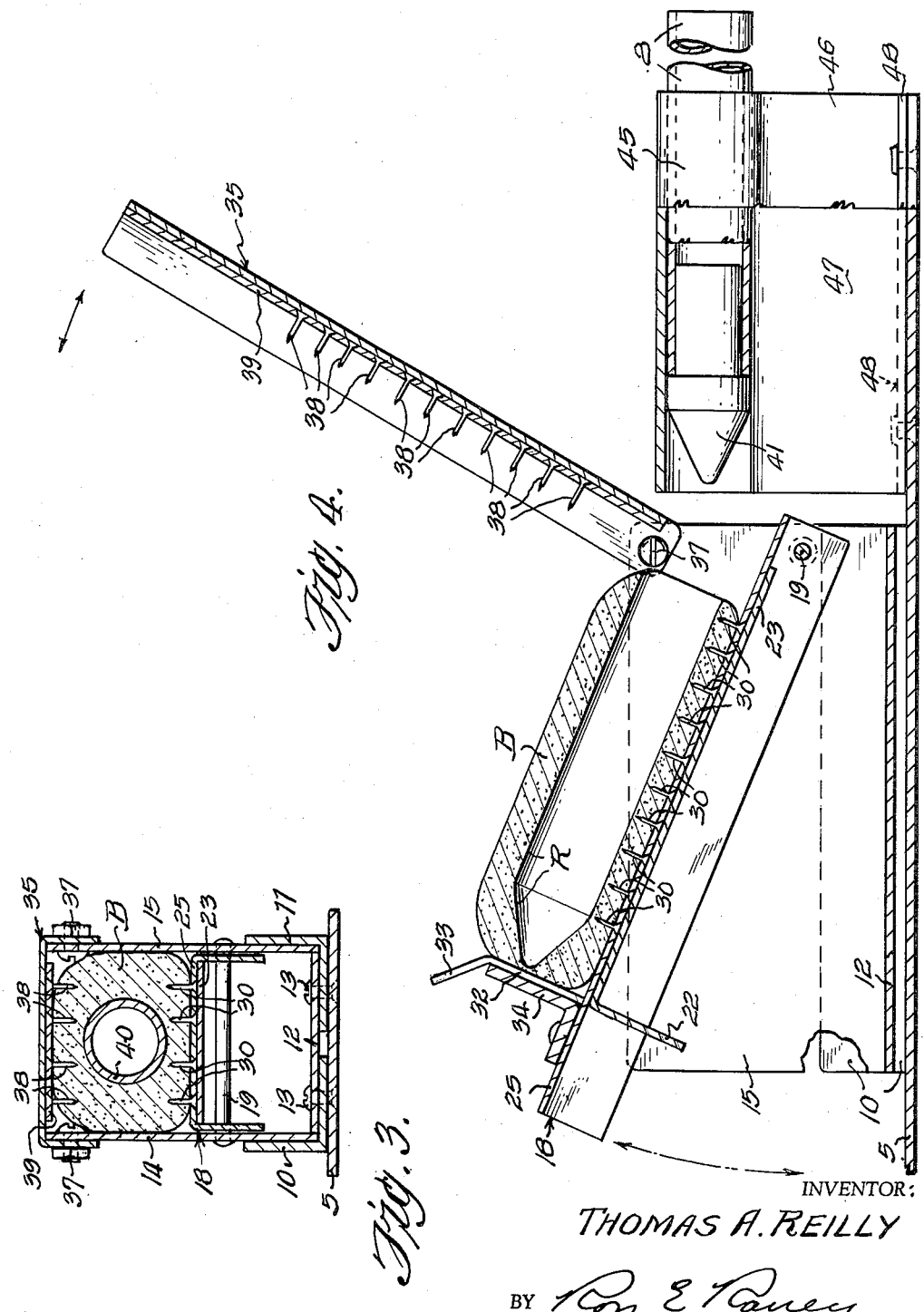

United States Patent Office 3,017,844
Patented Jan. 23, 1962

3,017,844
BUN OR THE LIKE TREATING APPARATUS
Thomas A. Reilly, 1616 21st St. S., Lot 302,
St. Petersburg, Fla.
Filed Aug. 10, 1959, Ser. No. 832,610
3 Claims. (Cl. 107—1)

The present invention relates to an improved apparatus for forming recesses in buns or the like into which an edible filling, such as a frankfurter, may be received.

The principal object of the invention is the provision of apparatus comprising a holder for a bun or the like and a guide for directing a ram-like recess forming member which may be forced into the bun so as to press form a suitable shape recess for receiving an edible filling, the apparatus including means to secure the bun while the forming member is forced therein comprising sharp pin-like elements piercing opposite sides of the bun substantially parallel to the movement of the member in forming the recess so that the bun is impaled by the elements and thereby prevented from collapsing or becoming distorted by the force of the forming member. Preferably, means are provided for preventing spreading of the unpierced opposed sides of the bun during the recess forming operation.

By forcing a recess in the bun by a non-cutting, ram-like member, all of the material of the bun is retained, and the recess so formed has relatively strong walls which are highly suited to retain an edible filling. The resultant food product can be conveniently handled, is highly resistant to breaking or crumbling and the filling is not easily lost therefrom.

Other objects and advantages of the invention will be apparent from the following description of a preferred form thereof, reference being made to the accompanying drawings wherein FIG. 1 is a sectional view of an apparatus for forming a recess in an elongated bun for the reception of a frankfurter;

FIG. 3 is a sectional view taken on line 3—3 of FIG. 2, and

FIG. 4 is a view similar to FIG. 1, but showing the parts in a position for removal of the bun.

Figure 1:
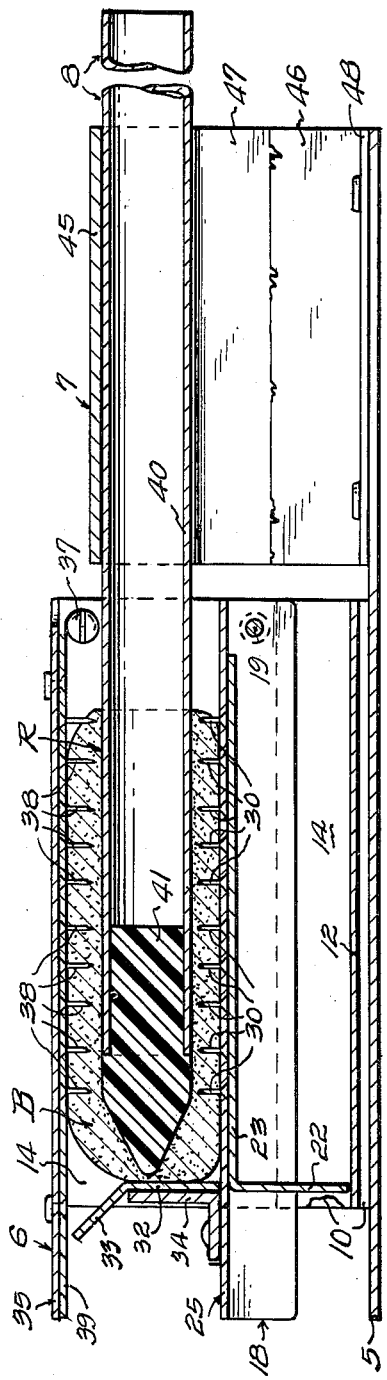
Figure 2:
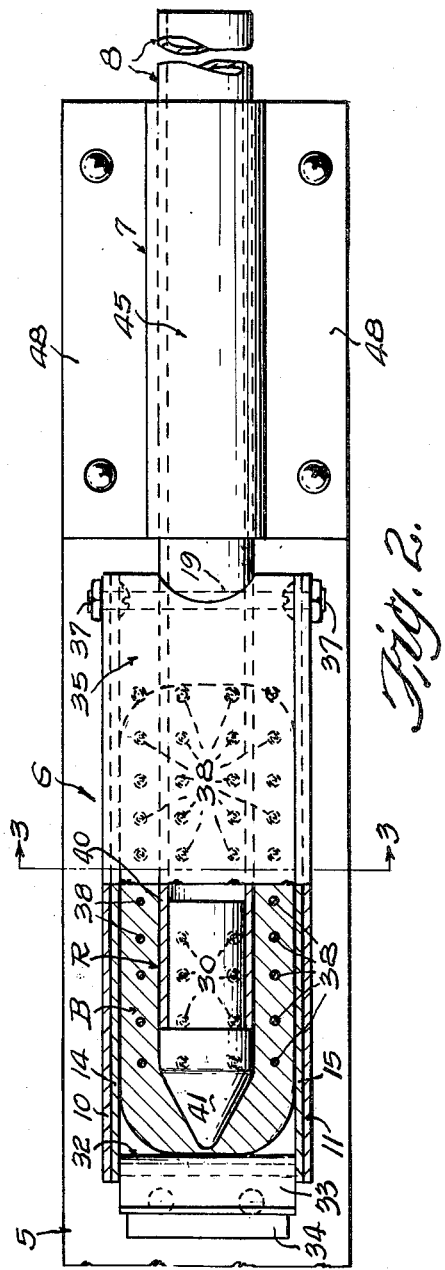
FIG. 2 is a plan view of the apparatus shown in FIG. 1, part thereof being shown in section.

While my improved apparatus may be used to prepare a bun-like food item for the reception of an edible filling it is particularly suitable for preparing the familiar elongated frankfurter bun for the reception of a frankfurter, and in the form shown comprises a base plate 5 having a bun holder 6 attached thereto adjacent to one end, and a plunger guide 7 attached to the opposite end and adapted to direct a recess forming plunger 8 into a bun B secured in the holder, as is described more fully hereinafter.

Bun holder 6 comprises a frame formed of two L-shaped metal strips 10, 11, an interconnecting floor plate 12, all riveted to foot plate 5 by rivets 13, and two spaced side plates 14, 15 riveted to the upright flanges of the L strips. An inverted channel member 18 is disposed between side plates 14, 15 and is pivotally supported at one end by a pin 19 extending through openings in the side plates. The other end of member 18 has a downwardly turned leg 22 formed of one end portion of a retainer plate 23 suitably attached to the underside of the transverse wall 25 of the channel member. The lower end of leg 22 rests on floor plate 12 to position wall 25 parallel to the floor plate. Side plates 14, 15 are spaced apart to receive the usual frankfurter bun therebetween and to prevent appreciable spreading of the bun sidewise when the recess is formed therein, which operation is explained hereinafter. Also, the height of the side plates above wall 25, when member 18 is resting on plate 12, is about equal to the depth of the usual frankfurter bun. As seen in FIG. 4, member 18 can be tilted clockwise about its pivot pin 19 so as to raise one end of the bun resting thereon above the top edges of the side plates to facilitate removal of the bun from the holder.

Wall 25 has a multiplicity of sharp pin-like bun piercing elements 30 which project upwardly through individual openings in the wall and which are held in place by heads formed thereon too large to pass through the opening in the wall and which are engaged by retainer plate 23 for securing the elements in place. The elements 30 are spaced from one another across the wall and substantially lengthwise thereof and pierce the bottom portion of a bun placed between side plates 14, 15 and pressed to the wall. The left-hand end of the bun receiving space between side plates 14, 15 is partially closed by a locating or end wall 32 which is formed by a plate 33 attached to an angle member 34 riveted to the top surface of wall 25. The upper end of plate 33 is bent to the left to facilitate insertion of a bun between walls 14, 15 and to form a handle for raising the bun receiving platform, as shown in FIG. 4.

It will be seen that side plates 14, 15, transverse wall 25 and end plate 33 form a receptacle for a bun, the right hand end of which is open and the top of which may be closed by a cover 35 in the form of an inverted channel member having the side flanges straddling side plates 14, 15 and which are drilled to receive a pivot pin 37 located in two aligned openings in the side plates. The underside of the transverse wall of cover 35 carries a series of pointed pin-like elements 38 which are carried in openings through a strip 39 riveted to the underside of the cover wall, the elements having heads too large to pass through the openings and being engaged by the underside of the cover wall. As seen in the drawings, elements 38 are closely spaced across the width and length of the cover and are adapted to pierce a bun placed between side plates 14, 15 when the cover is lowered to engage the top edges of the side plates. Thus, the pin-like elements 30 and 38 impale the bun along the lower and upper portions thereof, respectively.

The recess forming plunger 8 comprises a tubular member 40 having a tapered plug 41 attached in one end, the tapered end of the plug projecting from the tubular member and forming a piercing end for facilitating entrance of the plunger into the end of a bun inside the bun holder.

Plunger 8 is directed in endwise movement in a path substantially along the longitudinal center-line of the bun-receiving receptacle by the guide structure 7 which comprises a sheet metal member having a tubular section 45 formed at the central portion thereof and which is supported by two upstanding walls 46, 47, the lower portions of which have out-turned flanges 48 riveted to base plate 5. Tubular section 45 slidingly receives plunger 8 and is positioned to guide the plunger axially into the bun in the holder. It will be noted that the impaling elements 30 and 38 project short of the area into which plunger 8 is adapted to move.

The length of rod 40 is such that the right hand end portion may be grasped by the operator and moved toward the bun so that the tapered end is forced through the bun until stopped by end plate 33. The entrance of the plunger into the bun and the formation of a recess is facilitated by rotating the plunger as it is pressed into the bun.

To prepare a bun for the reception of a frankfurter, cover 35 is raised to the position shown in FIG. 4 and a bun, indicated at B, is then placed between side plates 14, 15 with one end adjacent to plate 33. Cover 35 is then lowered in place as shown in FIG. 1 which causes elements 38 to pierce the top portion of the bun and the bun is forced against wall 25 causing elements 30 to pierce the bottom portion of the bun. The operator then moves plunger 8 into the right hand end of the bun facing guide 7 and by oscillating the plunger about its axis and forcing it into the bun, the tapered end compresses the central portion of the bun, forcing it outwardly. Since the bun is completely enclosed along all sides by side plates 14, 15, bottom wall 25 and cover 35, the material of the bun is compressed to form a central recess R, conforming to the shape of the plunger. The pin-like elements 30 and 38, impale the upper and lower portion of the bun and thereby preventing the material of the bun from moving longitudinally with the plunger and thereby collapsing or "bunching" the bun under the endwise force applied by the plunger. The bun therefore retains its external form during the formation of the recess. After plunger 8 is withdrawn from the bun, a plug, not shown, approximately the shape of a frankfurter, may be inserted into the recess for a short period to set the walls thereof so that a frankfurter may then be readily inserted into the recess. The forcing of the recess compacts the bun material so that the bun is actually strengthened, thereby facilitating its handling and consumption. If desired, the bun may be processed as described while encased in a paper bag, so that maximum sanitary conditions are provided in the handling of this food item.

It will be appreciated that other forms, modifications and adaptations of the invention may be made from the form described, all of which fall within the scope of the following claims. It is to be understood that although "bun" is used in the claims, this term includes other items which may have a similar texture, shape, etc.

I claim:

1. A bun processing apparatus comprising in combination, a bun holding structure including two opposed side walls and a transverse bottom wall intermediate said side walls between which a bun may be received, a removable cover adapted to close the upper space between said side walls, said cover and bottom wall having a multiplicity of pin-like elements projecting therefrom inwardly of said structure for piercing the top and bottom sides of a bun placed within said walls and cover, means to pivot said bottom wall on an axis extending transversely of the planes of said side walls whereby said bottom wall may be tilted between said side walls, a recess forming member adapted to be moved parallel to said walls and between the inner ends of said pin elements to press form a recess in a bun received between said walls, and means to guide said member in a predetermined path between said walls.

2. A bun processing apparatus of the character defined in claim 1 in which the bottom wall and cover are pivoted adjacent to one end thereof, respectively, to said side walls and are individually tiltable relative to said side walls.

3. A bun processing apparatus comprising in combination, a bun holding structure including two opposed spaced walls one of which is movable toward and from the other to receive a bun therebetween, a multiplicity of closely spaced pin-like elements projecting from said walls toward the other wall for piercing opposite sides of a bun placed between said walls when said one wall is moved toward the other, said pin-like elements being closely spaced substantially throughout the length and breadth of said walls engaging the bun to pierce the bun in a grid-like pattern, a recess forming member of substantially cylindrical configuration and of a diameter approximately one-half the diameter of the bun and adapted to be moved longitudinally and parallel to said walls and between the inner ends of said pin-like elements to press form a recess in a bun contained between said walls, the diameter of said forming member being such as to displace and compress approximately half of the bun body outwardly and between the said pin-like elements whereby said elements are effective to block longitudinal movement of the bun walls and thereby permit compacting of the bun material laterally by longitudinal movement of said forming member without appreciable longitudinal distortion of the bun, and means to guide said forming member longitudinally in a predetermined path between said walls.

References Cited in the file of this patent

UNITED STATES PATENTS

| | | |
|---|---|---|
| 1,802,532 | Pulver | Apr. 28, 1931 |
| 1,871,837 | Brown | Aug. 16, 1932 |
| 1,879,146 | Estrin | Sept. 27, 1932 |
| 2,260,832 | Deutscher | Oct. 28, 1941 |
| 2,782,707 | Spies | Feb. 26, 1957 |